United States Patent
Goff

[15] 3,687,442
[45] Aug. 29, 1972

[54] TRUCK TIRE HOLDING AND INFLATION APPARATUS

[72] Inventor: Richard E. Goff, Kenosha, Wis.
[73] Assignee: Rollin F. Christopherson, Kenosha, Wis.
[22] Filed: Oct. 23, 1970
[21] Appl. No.: 83,379

[52] U.S. Cl. .................. 269/17, 144/288 A, 157/1, 157/1.11, 214/454, 269/47
[51] Int. Cl. .................. B60c 25/00, B62d 43/04
[58] Field of Search ............. 144/288 A; 157/1, 1.11; 214/451–454; 224/42.21, 42.23; 269/17, 47, 49, 74

[56] References Cited

UNITED STATES PATENTS 3,039,634  6/1962  Hobson et al. ............. 214/450
2,835,318  5/1958  Conger ..................... 157/1

FOREIGN PATENTS OR APPLICATIONS 562,513  9/1923  France ............... 224/42.21
757,159  10/1933  France ................. 214/454

Primary Examiner—Theron E. Condon
Assistant Examiner—Neil Abrams
Attorney—Charles B. Cannon

[57] ABSTRACT

A truck tire holding and inflation apparatus in which a truck tire to be inflated is mounted in upright or vertical position on an extensible tire-supporting member which is suspended from and below the body or frame of the truck and is extensible rearwardly thereof. The truck tire is held in position and the locking ring which holds the tire on its rim are held against movement during the inflating operation by the coaction of holding means mounted on the outer end portion of the extensible tire-supporting member and an abutment member which is in the form of a rear bumper-step plate or other cooperating part of the truck frame or body.

8 Claims, 9 Drawing Figures

Patented Aug. 29, 1972
3,687,442
2 Sheets-Sheet 1
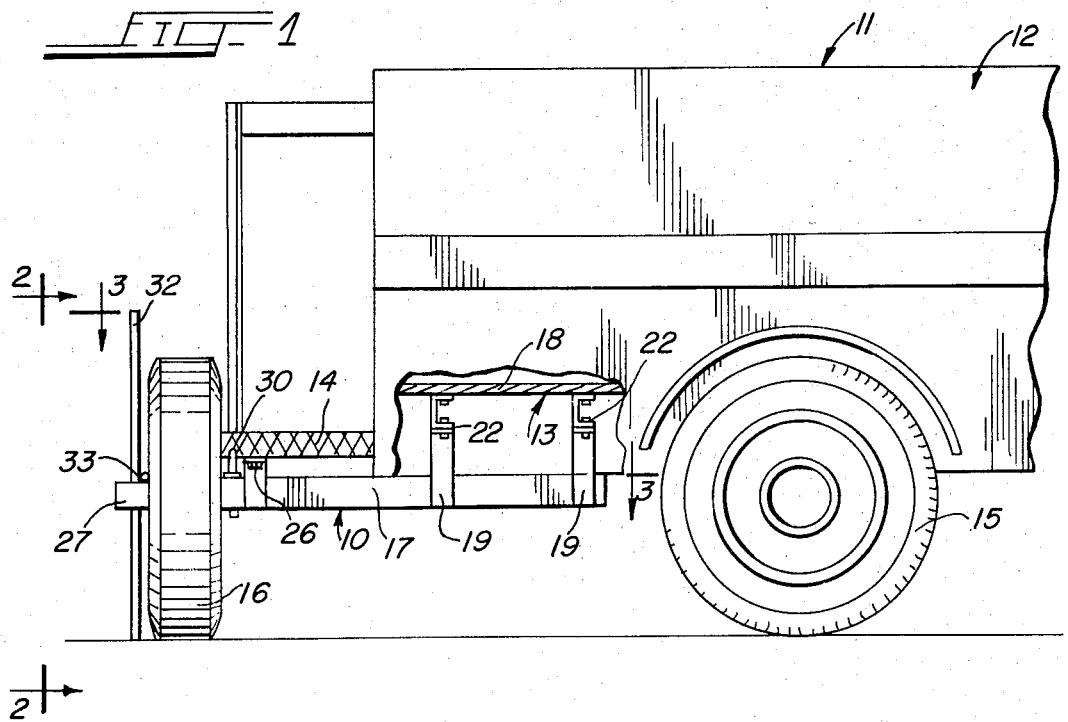
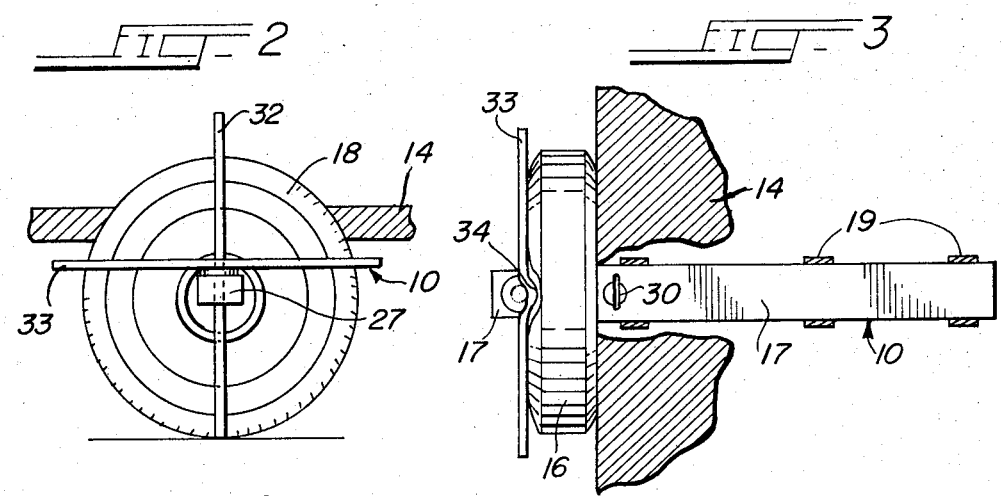
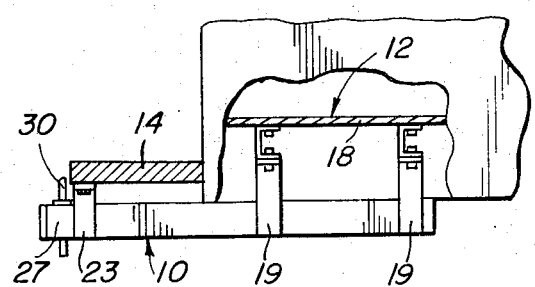
INVENTOR.
RICHARD E. GOFF
BY Charles B. Cannon
HIS ATTY.

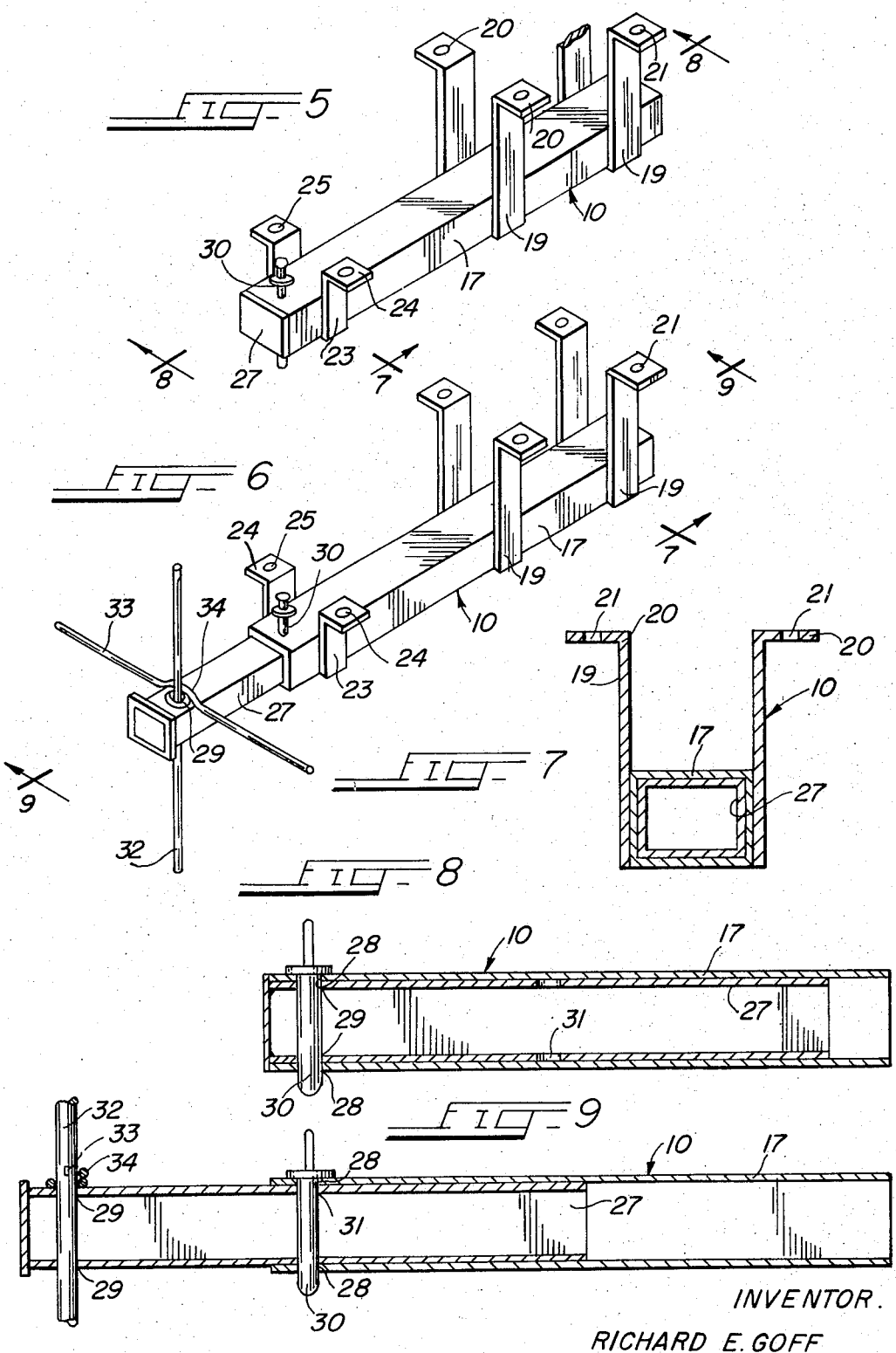

TRUCK TIRE HOLDING AND INFLATION APPARATUS

OBJECTS

An object of the invention is to provide a new and improved and relatively simple and inexpensive device for holding a truck tire and the locking ring which holds the tire on the rim in upright position and against movement during the operation of inflating the truck tire, and which may be readily stored on the truck body when not in use.

Another object of the invention is to provide a new and improved and relatively simple device for holding a truck tire in upright position at the rear of a truck and against danger of the locking ring becoming loose and endangering the workman, without the need for or use of a steel cage for holding the tire during the inflation operation as heretofore commonly used in the art.

A further object of the invention is to provide a new and improved device for holding a truck tire at the rear of a truck during the operation of inflating the tire and in which the rear bumper-step plate of the truck or other adjacent part of the truck frame or body forms part of the means for holding the tire during the inflating operation, so that the number of parts embodied in the new holding device is reduced to a minimum.

Other objects will appear hereinafter.

DESCRIPTION OF THE FIGURES

FIG. 1 is a fragmentary side elevational view, partly in section, of the rear portion of an automotive vehicle truck illustrating the use of the new truck tire holding and inflation apparatus;

FIG. 2 is a fragmentary side elevational view on line 2—2 in FIG. 1;

FIG. 3 is a sectional plan view on line 3—3 in FIG. 1;

FIG. 4 is a fragmentary view, partly in section and partly in elevation, illustrating the extensible telescopic supporting means embodied in the invention for supporting a truck tire and the manner in which the tire-supporting member embodied therein is suspended from the body of the truck;

FIG. 5 is a perspective view illustrating the extensible telescopic supporting means for supporting the truck tire in inwardly extended position and showing the means for suspending the extensible tire-supporting means from the body or frame of a truck;

FIG. 6 is a perspective view similar to FIG. 5 but showing the extensible telescopic tire-supporting means in extended position;

FIG. 7 is an enlarged transverse sectional view on line 7—7 in FIG. 6 illustrating the construction of the extensible telescopic tire-supporting means and the means for suspending the same from the body or frame of a truck at the rear thereof;

FIG. 8 is a central longitudinal sectional view on line 8—8 in FIG. 5; and

FIG. 9 is a central longitudinal sectional view on line 9—9 in FIG. 8.

DETAILED DESCRIPTION OF STRUCTURE

A typical and preferred embodiment of the invention is illustrated in the drawings, wherein it is generally indicated at 10, and is shown as being associated with an automotive vehicle truck 11 which includes a truck body and frame generally indicated at 12 and which includes a bottom wall 13, a rear bumper and step plate 14, and tires 15 and 16, the tire 16 being shown as removed from its wheel mounting and arranged in upright position at the rear of the truck for inflation.

The new truck tire holding and inflating apparatus 10 comprises a telescopically extensible tire-supporting device which includes an elongated tubular guide member 17 which is preferably made of steel or like metal and is preferably rectangular or channel-shaped in cross section (FIG. 7). The inner end portion of the elongated channel-shaped guide member 17 is suspended from the floor or bottom wall 18 of the truck body 12 by suspension means in the form of hanger members 19 each of which is welded to an outer side wall of the elongated tubular guide member 17 and each of which hanger members 19 has at its upper end a laterally extending arm 20 having an opening 21 therein for the reception of a fastening element in the form of a bolt 22 by which each of the hanger members 19–20 is attached to one of a plurality of transversely extending channel-shaped members 35 which extend across the floor or bottom wall of the truck body 12, and support the truck body 12. The outer end portion of the elongated tubular or channel-shaped guide member 17 is suspended from the rear bumper-step plate 14 or other part of the frame of the truck by hanger members 23 each of which is welded to the outer side wall of the elongated tubular guide member 17 and each of which has a laterally extending arm 24 at its upper end. Each of the arms 24 has an opening 25 therein for the passage of a fastening element in the form of a bolt 26 by which the hanger members 23–24 may be attached to and suspended from the rear bumper-step plate 14 or like part of the truck at the rear thereof (FIG. 1).

The extensible telescopic supporting tire-supporting means includes an elongated tubular or channel-shaped steel or like tire-supporting member 27 which is slidably and telescopically mounted within the elongated tubular guide member 17; the extensible inner slidable tire-supporting member 27 being normally latched or held in inwardly extended position within the outer tubular guide member 17 by a latching pin member 30 which is normally slidably inserted through pairs of registered openings 28 and 29 which are formed in the top and bottom walls of the members 17 and 27, respectively. However, as shown in FIGS. 8 and 9, the inner and extensible tire-supporting member 27 has a second pair of aligned holes or openings 31 formed in the top and bottom walls thereof rearwardly or inwardly of the first pair of holes or openings 29, for a reason which will be pointed out hereinafter.

The tire and locking ring holding means embodied in the new truck tire holding and inflation device 10 includes a (in use) vertically extending holding rod member 32 and a (in use) horizontally extending holding rod member 33 which has a laterally offset portion 34 formed centrally therein between its ends.

OPERATION AND USE

The outer tubular or channel-shaped member 17 is mounted on the floor or bottom wall 18 of the truck body 12 by the suspension means in the form of the hanger members 19–20 and 23–24, as described, and the inner and extensible tire-supporting tubular or channel-shaped member 27 is slidably and telescopically inserted into the body of the outer tubular guide member 17 in which it is normally latched and held in position of use by inserting the latching pin member 30 through the aligned or registered holes or openings 28–28–29–29 in the tubular members 17 and 27, respectively, as shown in FIG. 8.

However, when it is desired to use the new truck tire holding and inflating apparatus, to inflate a tire, as 16, the latching pin member 30 is manually removed from the latching holes or openings 28–28–29–29 in the tubular members 17 and 27, respectively, and the inner tubular member 27 is slidably extended to the rear of the truck body 12 under and rearwardly of the rear bumper or like part of the truck body or frame, as in FIGS. 1, 2 and 3, whereupon the inner tubular tire-supporting member 27 is latched in its thus rearwardly extended position by manually inserting the latching pin member 30 through the then aligned or registered holes or openings 28–28–31–31 in the outer and inner tubular members 17 and 27, respectively (FIG. 9).

The tire 16 is then slid in upright position onto the rearwardly extending portion of the inner tubular tire-supporting member 27 and into abutting engagement with the rear bumper of adjacent part of the truck body or frame, whereupon the horizontally extending holding rod member 33–34 is placed in horizontal position across the outer and rearwardly extending end portion of the tubular tire-supporting member and diametrically across the tire 16 (FIG. 2), with its laterally offset center portion 34 abutting the tire 16. The holding or licking rod member 32 is then inserted vertically through the registered holes or openings 29–29 in the outer end portion of the inner tire-supporting tubular member 27, and diametrically across the tire 16 (FIG. 2) with the lower end portion of the vertically extending holding or locking rod member 32 resting on the ground or like supporting surface and with the central portion of the holding or locking rod member engaging the laterally offset central portion 34 of the horizontally extending locking or holding rod member 33 and thereby holding the horizontally extending holding rod member 33 in holding engagement with the tire 16 while, at the same time, holding the tire 16 in abutting engagement with the rear bumper-step plate 14 or like part of the truck. The rear bumper-step plate 14 of like part of the truck thus acts as an abutment member and as a part of the holding means for holding the tire 16 in proper position of use during the inflating operation.

The tire 16 may then be inflated without risk that the locking ring embodied therein might become loose from the tire and its rim and endanger the workman.

After the tire 16 has been inflated the vertically extending lock or holding rod member 32 may be pulled upwardly out of the openings 29 in the inner tubular tire-supporting member 27 and the horizontally extending locking or holding rod members 33–34 removed from the outer end portion of the inner tubular tire-supporting member 27 and the two locking or holding rod members then stored in a tool box or like place in or on the truck body 12. The latching pin member 30 may then be removed from the latching holes or openings 28–28 and 31—31 in the members 17 and 27, respectively, (FIG. 9), and the inner tubular tire-supporting member 27 then telescopically slid inwardly into its inwardly extended position, as in FIG. 8, in which it may be latched by inserting the latching pin member 30 through the then aligned openings 28–28 and 29–29 in the outer and inner tubular members 17 and 27, respectively.

It will thus be seen from the foregoing description, considered in conjunction with the accompanying drawings, that the present invention provides a new and improved and relatively simple and inexpensive device for holding a truck tire and its locking ring in upright position of use at the rear of a truck body while utilizing the rear bumper-step plate or like part of the truck as an abutment member and as a part of the tire-holding means and without the need for or use of any complicated or expensive and difficult to operate tire cage, thereby accomplishing the foregoing objects of the invention and other objects inherent therein.

I claim:

1. Truck tire holding and inflation apparatus comprising, in combination
   a. a truck including
      1. a truck body having at the rear thereof a part providing
      2. a tire abutment member;
   b. rearwardly extensible tire-supporting means for supporting a truck tire in upright position at the rear of the truck body and rearwardly of the said tire abutment member;
   c. guide means for supporting the said rearwardly extensible tire-supporting means from and below the said truck body for movement in a generally horizontal plane from a normal inwardly extended and stored position to a rearwardly extended tire-supporting position;
   d. means for suspending the guide means and the said tire-supporting means carried thereby from and below the said truck body;
   e. means for latching the said rearwardly extensible tire-supporting means in a normally inwardly extended stored position to the said guide means; and
   f. tire-holding means supported by the said rearwardly extensible tire-supporting means and extending across and relative to one side of a truck tire supported in upright position on the said rearwardly extensible tire-supporting means and on the opposite side of the said tire from the side of the tire at which the said abutment member is arranged for holding the said truck tire in engagement with the said tire abutment member during the operation of inflating the said truck tire.

2. Truck tire holding and inflation apparatus as defined in claim 1 in which
   a. said rearwardly extensible tire-supporting means and the said guide means therefor are in the form of telescopically interconnected members.

3. Truck tire holding and inflation apparatus as defined in claim 1 in which
   a. the said guide means is in the form of an elongated guide member generally tubular-shaped in cross section; and in which
   b. the said truck tire-supporting means is in the form of an elongated tire-supporting member generally tubular-shaped in cross section and slidably and telescopically mounted in the said elongated and generally tubularishaped guide member.

4. Truck tire holding and inflation apparatus as defined in claim 3 in which
   a. the said latching means includes manually operable means for latching the said elongated tire-supporting member to the elongated generally tubular-shaped guide member selectively in an inwardly extended stored position and in a rearwardly extended tire-supporting position.

5. Truck tire holding and inflation apparatus as defined in claim 4 in which
   a. the said tire-holding means includes
      1. a manually operable first tire-holding member removably mounted on the said generally tubular-shaped tire-supporting member in an upright position at one side of the said truck tire and on the opposite side of the said tire from the side thereof which the said abutment member is arranged; and
      2. a second manually operable tire-holding member removably mounted on the said generally tubular-shaped tire-supporting member in a generally horizontal position relative to and at the said one side of the said truck tire.

6. Truck tire-holding and inflation apparatus as defined in claim 5 in which
   a. the said second manually operable tire-holding member is urged by the said first tire-holding member into engagement with the said one side of the said truck tire.

7. Truck tire holding and inflation apparatus as defined in claim 1 in which
   a. the said truck tire abutment member is in the form of
      1. the rear bumper-step plate of the said truck.

8. Truck tire holding and inflation apparatus comprising
   a. truck tire-supporting means adapted to be mounted on and carried by an automotive vehicle truck body for supporting a truck tire in upright position at one end of the said truck body;
   b. means for mounting the said truck tire-supporting means on the said truck body;
   c. the said truck tire-supporting means including an extensible truck tire-supporting member normally disposed in an inwardly extended and stored position under the said truck body but is extensible to an extended positioned outwardly of one end of the said truck body during the operation of supporting a truck tire on the said tire-supporting member during the operation of inflating the said truck tire;
   d. the said means for mounting the said truck tire-supporting member including
      1. means for slidably guiding the said extensible truck tire-supporting member during movement from its normal inwardly extended or stored position to its said extended position and for holding the said extensible tire-supporting member in both of said positions;
   e. manually operable latching means for selectively latching the said extensible tire-supporting member in either of its aforesaid positions;
   f. abutment means on the truck body;
   g. manually operable tire-holding means adapted to be removably mounted on the said extensible tire-supporting member, on the opposite side of the said tire from the side thereof at which the said abutment means is arranged, when the said tire-supporting member is in said extended position, and cooperating with the said abutment means for holding a truck tire in upright position on the said tire-supporting member during the operation of inflating the said truck tire.

* * * * *